(12) United States Patent
Misawa (10) Patent No.: US 6,798,617 B2
(45) Date of Patent: Sep. 28, 2004

(54) CLEANING TAPE FOR MAGNETIC HEAD SYSTEM WITH MAGNETORESISTANCE EFFECT HEAD

(75) Inventor: Yuji Misawa, Tsukuba-gun (JP)

(73) Assignee: Hitachi Maxell, Ltd., Osaka (JP)

( * ) Notice: Subject to any disclaimer, the term of this patent is extended or adjusted under 35 U.S.C. 154(b) by 158 days.

(21) Appl. No.: 09/950,599

(22) Filed: Sep. 13, 2001

(65) Prior Publication Data

US 2002/0086183 A1 Jul. 4, 2002

(30) Foreign Application Priority Data

Sep. 13, 2000 (JP) ........................................ 2000-278920

(51) Int. Cl.$^7$ ................................................. G11B 5/10
(52) U.S. Cl. ....................................................... 360/128
(58) Field of Search ......................................... 360/128

(56) References Cited

U.S. PATENT DOCUMENTS 5,847,905 A * 12/1998 Inaba .......................... 360/128
5,985,409 A    11/1999 Miyazaki et al.

FOREIGN PATENT DOCUMENTS

| EP | 0 617 427 A2 | 9/1994 |
|---|---|---|
| JP | 59-16124 | 1/1984 |
| JP | 59-48815 | 3/1984 |
| JP | 6-274839 | 9/1994 |
| JP | 8-45039 | 2/1996 |
| JP | 9-155749 | 6/1997 |
| JP | 9-320021 A | 12/1997 |
| JP | 10-289428 A | 10/1998 |
| JP | 2000-11340 | 1/2000 |
| JP | 2000-11581 | 1/2000 |
| JP | 2000-57541 | 2/2000 |

\* cited by examiner

Primary Examiner—A. J. Heinz
(74) Attorney, Agent, or Firm—Birch, Stewart, Kolasch & Birch, LLP (57) ABSTRACT

A cleaning tape for a magnetic head system having a magnetoresistance effect head as a reproducing head, comprising a nonmagnetic support, and a cleaning layer containing a magnetic powder and a binder formed on one surface of said support, wherein said cleaning layer has a specific surface resistivity of $3\times10^3$ to $5\times10^8$ $\Omega/cm^2$, does not cause performance failure due to the electrostatic breakdown of the magnetic head or the generation of an electric current, which does not cause performance failure due to electrostatic breakdown of a magnetic head or the generation of an electric current.

3 Claims, 1 Drawing Sheet

CLEANING TAPE FOR MAGNETIC HEAD SYSTEM WITH MAGNETORESISTANCE EFFECT HEAD

FIELD OF THE INVENTION

The present invention relates to a cleaning tape for cleaning a magnetic head installed in magnetic recording-reproducing equipment.

PRIOR ART

When a magnetic tape is traveled in magnetic recording-reproducing equipment for audio use, video use or computer use, stains tend to adhere to a surface (in contact with the magnetic tape) of a magnetic head (hereinafter sometimes simply referred to as "head") or tape-traveling systems such as guide rolls. If such stains are left uncleaned, they will cause various problems such that they will interfere with the accurate traveling of the tape or decrease a reproduction output. Thus, the head and the tape-traveling system should be periodically cleaned to avoid such problems and maintain the reliability of the magnetic recording-reproducing equipment.

Figure 1:
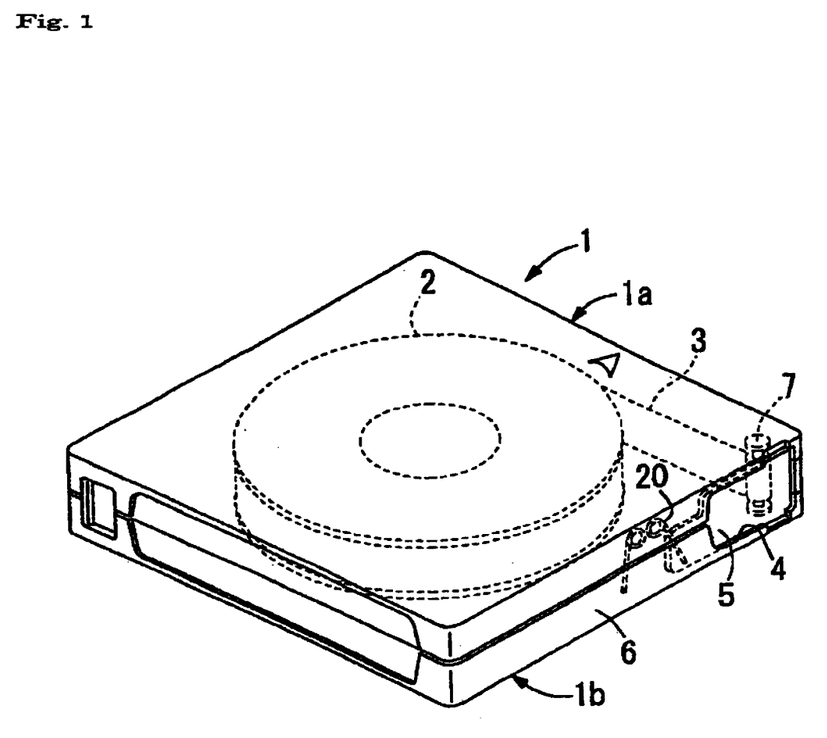
FIG. 1 is a perspective view of a one-reel cassette in which the cleaning tape of the present invention is set.

A cleaning tape used for such a cleaning purpose (herein a dry-type cleaning tape using no organic solvent) comprises a nonmagnetic support having, on one surface thereof, a cleaning layer which contains a magnetic powder, an abrasive, carbon black (an antistatic agent), a lubricant and a binder. To clean the magnetic head and the like, the cleaning tape is traveled with allowing the cleaning layer in contact with the surface of the magnetic head and the like. Thereby, the surface of the head and the like are abraded with the abrasive in the cleaning head. As a result, the stains adhered to the surface of the magnetic head and the like is scraped off and removed. In the cleaning step, the cleaning tape should be traveled while being in contact with the surface of the magnetic head under substantially the same conditions as those under which a magnetic tape travels, so that the surface of the magnetic head is not flawed, or the contact condition between the magnetic head and the magnetic tape (namely, head contact) is not altered. That is, it is necessary for the cleaning tape to reproduce the same contact with the head as the magnetic tape. Such a requirement becomes increasingly strict in these years with the adoption of a MR head, that is, a magnetic head comprising a magnetoresistance effect device) having a high sensitivity. A system having a MR head with a high sensitivity uses a one-reel cassette, which is shown in FIG. 1, as a cleaning tape cassette.

The structure of the one-reel cassette of FIG. 1 will be explained. The one-reel cassette comprises the box-shaped case body 1, which is made by bonding the upper and lower cases 1a and 1b in the cover-shut state, and the cleaning tape 3 which is wound on the single reel 2 installed in the case body 1. The tape-pulling opening 4 opens at one side end of the front wall 6 of the case body 1. The opening 4 is opened and closed with the slidable door 5. To manipulate the cleaning tape 3 with drawing it outside the case from the reel, the tape-drawing equipment 7 is connected with the leading end of the cleaning tape 3. The cassette has the door spring 20 for moving the door 5 to the closed position.

In the meantime, the cleaning tapes described above are produced with a production line of magnetic tapes rather than a production line exclusive for the cleaning tapes mainly from the viewpoint of production costs (see, for example, JP-A-2000-57541). That is, the cleaning tapes are produced with substantially the same materials as those used for the production of the magnetic tapes by substantially the same process as that for the production of the magnetic tapes. Therefore, in some cases, the cleaning tapes are produced with forming a primer layer between the nonmagnetic support and the cleaning layer (which corresponds to the magnetic layer of the magnetic tape), or a back coat layer on the back surface of the nonmagnetic support (the surface opposite to the surface on which the cleaning layer is formed). The major differences of the cleaning tape and the magnetic tape are that the cleaning tape contains the relatively large amount of the abrasive in the cleaning layer to achieve the intended cleaning effect, that the surface of the cleaning layer is made relatively rough by the elimination of a calendering step in the production process or by the change of the conditions of the calendering step, and that the length of the tape of the cleaning tape is shorter than that of the magnetic tape.

Another type of a cleaning tape is known from, for example, JP-A-6-274839 and JP-A-2000-11340. In such a cleaning tape, to avoid the excessive cleaning of the magnetic head, data for monitoring are recording in the surface layer of the cleaning layer, and whether the magnetic head is properly cleaned is judged from the change of the output of the above data which are read with the magnetic head in the course of cleaning. Furthermore, a cleaning tape is known, in which a signal is recorded in a region of the cleaning tape which has bean used, and an unused region of the cleaning tape is used to clean the magnetic head. Such cleaning tapes are used in the one-reel cassette cleaning system described above. With such cleaning tapes, it is preferable that the cleaning layer has specific output characteristics and electromagnetic conversion characteristics so that the cleaning condition or the used regions can be exactly judged from the data read. From such a viewpoint, the cleaning tapes are produced from substantially the same materials as those used for the production of the magnetic tapes.

In these years, in the field of the magnetic recording-reproducing equipment and the magnetic recording media, the recording wavelength has been shortened and the thickness and the length of the tape are reduced and increased to increase the recording density. Thus, the contact condition of the magnetic tape to the magnetic head should be maintained more accurately than ever. Otherwise, a sufficient reproducing output cannot be attained.

In addition, recently, equipment for recording and reproducing magnetic tapes having the MR head described above as the magnetic head is practiced. However, the MR head causes electrostatic breakdown when a material largely charged is in contact with the MR head, while the magnetic field from the tape is disordered with the magnetic field generated with an electric current from the magnetic head to the tape so that noise is generated in the MR head when a material having excessively high conductivity is in contact with the MR head. In either case, the MR head cannot function normally. Therefore, the requirement for the conductivity of the cleaning tape for cleaning the MR head becomes more and more strict. With the stains on the surface of the magnetic head, more strict control is required than with a MIG head (a metal-in-gap type magnetic head).

In spite of the decrease of the recording wavelength and the promotion of the thinning and elongation of the tape as the medium in the field of magnetic recording in these years, the conventional cleaning tape cannot cope with such technical progresses and changes. For example, one problem is the conductivity of the cleaning tape. That is, it is necessary to suppress the charge of the cleaning tape for cleaning the MR head to avoid the electrostatic breakdown caused by the contact, while the conductivity should not be excessively high to avoid the generation of the current caused by the contact of the tape with the magnetic head. However, these points are not taken into consideration with the conventional cleaning tape, which has a specific surface resistivity of $10^{10}$ $\Omega/cm^2$ to $10^{13}$ $\Omega/cm^2$. Therefore, the conventional cleaning tape may cause the electrostatic breakdown caused by the contact with the MR head.

The conventional cleaning tape may unevenly abrade the magnetic head because of the deterioration of the contact of the tape with the head due to the thinning of the tape. That is, the thickness of the cleaning tape and the contact of the tape with the magnetic head have a close relationship. Thus, when the magnetic tape is made thin, the cleaning tape is also made thin so that the cleaning tape attains the same contact with the head as the magnetic tape made thin. However, since the cleaning tape has the larger abrasion property than the magnetic tape, simple thinning of the cleaning tape may lead to the uneven abrasion of the magnetic head because of the deterioration of the contact of the cleaning tape with the head caused by the thinning of the cleaning tape.

SUMMARY OF THE INVENTION

One object of the present invention is to provide a cleaning tape which is suitable for cleaning the high sensitivity magnetic head such as the MR head and does not cause performance failure due to the electrostatic breakdown of the magnetic head or the generation of an electric current.

Another object of the present invention is to provide a cleaning head which can achieve good contact with the head and thus avoid the uneven abrasion of the magnetic head.

According to the present invention, the above objects can be achieved by a cleaning tape for a magnetic head system having a magnetoresistance effect head as a reproducing head, comprising a nonmagnetic support, and a cleaning layer containing a magnetic powder and a binder formed on one surface of said support, wherein said cleaning layer has a specific surface resistivity of $3\times10^3$ to $5\times10^8$ $\Omega/cm^2$ according to JIS C 6240-1970U.

DETAILED DESCRIPTION OF THE INVENTION

The cleaning layer of the cleaning tape of the present invention has a specific surface resistivity of $3\times10^3$ to $5\times10^8$ $\Omega/cm^2$. Herein the specific surface resistivity is measured according to JIS C 6240-1970U (page 7)

When the surface resistivity of the cleaning layer is less than $3\times10^3$ $\Omega/cm^2$, the malfunction may be highly caused since the electric current flows from the magnetic head such as the MR head to the tape when the cleaning tape is in contact with the head. When the surface resistivity of the cleaning layer exceeds $5\times10^8$ $\Omega/cm^2$, the charging property is enhanced, and thus the electrostatic breakdown of the magnetic head may be caused by the contact of the cleaning tape with the magnetic head. To prevent the electrostatic breakdown of the magnetic head and the generation of an electric current from the magnetic head, the surface resistivity of the cleaning layer is preferably from $5\times10^3$ to $1\times10^9$ $\Omega/cm^2$, more preferably from $1\times10^4$ to $1\times10^8$ $\Omega/cm^2$.

A center line-average surface roughness Ra of the cleaning layer may be made larger than that of the magnetic layer of the magnetic tape to achieve the good abrasion effect, that is, the good cleaning effect. That is, the center line-average surface roughness of the cleaning layer is usually from 5 nm to 30 nm, preferably from 10 nm to 30 nm, more preferably from 12 nm to 25 nm. When the center line-average surface roughness of the cleaning layer is less than 5 nm, the cleaning effect may be insufficient. When the center line-average surface roughness exceeds 30 nm, the abraded surface may be roughened or the life of the magnetic head may be shortened.

The surface roughness of the cleaning layer can be controlled in the above range by the adjustment of the calendering conditions. When the cleaning layer is calendered prior to curing, preferably, a calendering temperature is from 40 to 75° C. and a calendering linear pressure is from 50 to 150 kg/cm. When the cleaning layer is calendered after curing, the calendering conditions are made severer than those employed in the calendering prior to curing, since the cleaning layer is already cured. Preferably, a calendering temperature is from 50 to 80° C. and a calendering linear pressure is from 50 to 150 kg/cm.

The cleaning layer may be a single layer, or a multi-layer having at least one primer layer. When the cleaning layer has two or more layers, the composition of the lower layer (the layer near the support) is preferably adjusted to impart the necessary conductivity to the lower layer, for example, by the increase of the amount of carbon black. Thus, the static electricity generated in the upper layer, which is in contact with the magnetic head, can escape through the lower layer, and the increase of the charging amount in the upper layer can be suppressed.

In the cleaning tape of the present invention, the Young's modulus of the tape in the machine direction (MD) is preferably from 7 GPa to 15 GPa. When the Young's modulus of the tape in the machine direction is less than 7 GPa, the cleaning effect decreases. When this Young's modulus exceeds 15 GPa, the contact of the tape with the magnetic head becomes severe resulting in the flaws and uneven abrasion of the magnetic head.

The good contact of the cleaning tape with the magnetic head may be achieved when the whole thickness T of the cleaning tape and the Young's modulus E of the cleaning tape in the machine direction are adjusted so that $ET^3$ is in the range from $4\times10^{-7}$ Pa·m³ to $1.1\times10^{-5}$ Pa·m³. When $ET^3$ is less than $4\times10^{-7}$ Pa·m³, the cleaning tape may be easily broken. When $ET^3$ exceeds $1.1\times10^{-5}$ Pa·m³, the magnetic head may be unevenly abraded.

The whole thickness of the cleaning tape is preferably from 3 to 9 μm. When the whole thickness of the cleaning tape is less than 3 μm, it is difficult to form the cleaning layer. When the whole thickness exceeds 9 μm, the tape length per one reel is shortened.

To increase the traveling property of the cleaning tape, a back coat layer can be formed on the surface of the nonmagnetic support opposite to the surface on which the cleaning layer is formed.

The materials to be used to produce the cleaning tape of the present invention are explained.

Nonmagnetic Support

The nonmagnetic support may be a film or a sheet of any nonmagnetic material, which can be used in the magnetic tape, for example, synthetic resins such as polyethylene terephthalate, polyethylene naphthalate, aromatic polyamide, aromatic polyimide, etc. The thickness of the nonmagnetic support is usually from 2 to 8 µm, preferably from 2.5 to 6 µm. When the thickness of the nonmagnetic support is less than 2 µm, it may be difficult to form the support film, and the strength of the cleaning tape may decrease. When the thickness of the nonmagnetic support exceeds 8 µm, the whole thickness of the cleaning tape becomes too large so that it is difficult to achieve the good contact of the tape with the magnetic head.

When a nonmagnetic support having a thickness exceeding 8 µm is used to produce the magnetic tape, the whole thickness of the magnetic tape becomes too large so that the recording capacity per one reel of the tape decreases. Therefore, the nonmagnetic support having a thickness of 8 µm or less is preferably used. When the cleaning tape of the present invention is produced using the production line of the magnetic tape, generally the same materials as those used in the production of the magnetic tape are used. From such a viewpoint, the above thickness range of the support for the cleaning tape of the present invention is preferable. Such a reasoning can also apply to the selection of other materials except for the differences of the magnetic tape and the cleaning tape, such as the amount of the abrasive, the surface roughness of the uppermost layer of the tape, etc.

The nonmagnetic support used in the thin cleaning tape (having a thickness of 3 µm to less than 7 µm) preferably has a Young's modulus of at least 10.13 GPa in the machine direction and a ratio of the Young's modulus in the machine direction to that in the transverse direction in the range between 0.4 and 0.8. More preferably, the Young's modulus in the machine direction is at least 11.11 GPa and the ratio of the Young's modulus in the machine direction to that in the transverse direction is from 0.55 to 0.75. When the Young's modulus in the machine direction is less than 11.13 GPa, $ET^3$ decreases and thus the cleaning tape becomes weak and the traveling becomes unstable. When the ratio of the Young's modulus in the machine direction to that in the transverse direction is less than 0.4 or larger than 0.8, the characteristic of the cleaning tape itself, the characteristic of the magnetic tape which is traveled after cleaning, and the flatness of the output between the entrance and exit of a track may deteriorate, although mechanism of such deterioration has not bee clarified. This flatness is minimized when the ratio of the Young's modulus in the machine direction to that in the transverse direction is around 0.7.

Examples of the nonmagnetic support which satisfies the above properties include biaxially stretched aromatic polyamide films, aromatic polyimide films, etc.

Cleaning Layer

The thickness of the cleaning layer (including the optional primer layer) is preferably from 1 to 5 µm, more preferably from 2 to 3 µm. When the thickness of the cleaning layer is less than 1 µm, it may be difficult to form the cleaning layer. When the thickness of the cleaning layer exceeds 5 µm, not only the production cost increases but also the stiffness of the tape becomes too high. When the signals are recorded on the cleaning tape and reproduced with the MR head, the product (Br·σ) of a residual magnetic flux density (Br) and a thickness (σ) of the cleaning layer is preferably from 0.005 to 0.08 µTm. When this product is less than 0.005 µTm, the reproduction output is low. When this product exceeds 0.08 µTm, the sensitivity of the MR head is surpassed to cause the reproduction skew. This product is preferably from 0.01 to 0.07 µTm, more preferably from 0.01 to 0.065 µTm.

Magnetic Powder

The magnetic powder to be contained in the cleaning layer may be ferromagnetic iron metal powder, plate-form hexagonal ferrite powder, etc. The average axis length of the ferromagnetic iron metal powder is preferably from 0.03 to 0.30 µm, more preferably from 0.03 to 0.25 µm particularly preferably from 0.03 to 0.20 µm. When the average axis length is less than 0.03 µm. the aggregation force of the magnetic powder increases when a coating composition for the formation of the cleaning layer is prepared so that it is difficult to disperse the magnetic powder in the composition. When the average axis length exceeds 0.3 µm, the coercive force of the magnetic powder decreases so that the particle noise due to the particle size of the powder increases. When the plate-form hexagonal ferrite powder is used, the size of the plate is preferably from 0.001 to 0.5 µm for the same reason as described above in connection with the ferromagnetic iron metal powder.

Herein, the average axis length is obtained by taking a scanning electron micrograph of the powder, measuring the actual size of the particles, and averaging the measured sizes of 100 particles.

The BET specific surface area of the ferromagnetic iron metal powder is preferably at least 35 m$^2$/g, more preferably at least 40 m$^2$/g, most preferably at least 50 m$^2$/g.

When the same ferromagnetic iron metal powder is used in the cleaning layer of the cleaning tape according to the present invention and in the magnetic layer of the magnetic tape, the coercive force of the ferromagnetic iron metal powder is preferably from 120 to 280 kA/m (1,500 to 3,500 Oe), more preferably from 140 to 240 kA/m. The saturation magnetization of such ferromagnetic powder is preferably from 120 to 200 A·m$^2$/kg (120 to 200 emu/g).

In the case of the plate-form hexagonal ferrite powder, the preferred range of the coercive force is the same as that for the ferromagnetic powder, while the saturation magnetization is preferably from 50 to 65 A·m$^2$/kg (50 to 65 emu/g).

Herein, the values of the coercive force and the saturation magnetization are measured with a sample vibration type magnetometer at an external magnetic field of 1.28 MA/m (16 kOe).

Abrasive

The abrasive to be contained in the cleaning layer may be an abrasive having a Mohs hardness of at least 6, such as α-alumina, β-alumina, fused alumina, chrome green, silicon carbide, cerium oxide, α-iron oxide, corundum, artificial diamond, silicon nitride, titanium carbide, titanium oxide, silicon dioxide, boron nitride, etc. Although these abrasives may be used independently, they are preferably used in combination of two or more to achieve the good cleaning effect. Among them, alumina and chrome green are preferably used in combination since they are hard and can achieve good head-cleaning effects in a small amount.

The average particle size of the abrasive is preferably from 0.02 to 0.7 µm, more preferably from 0.05 to 0.6 µm The amount of the abrasive is preferably from 10 to 30 wt. %, more preferably from 15 to 25 wt. %, based on the weight of the magnetic powder.

Carbon Black

Conventional carbon black may be added to the cleaning layer to increase the conductivity and the surface lubricity of the cleaning layer. Examples of the carbon black include acetylene black, furnace black, thermal black, etc. The particle size of the carbon black is usually from 5 to 200 nm, preferably from 10 to 100 nm When the particle size of the carbon black is less than 10 nm, it is difficult to disperse the carbon black in the coating composition of the cleaning layer. When the particle size exceeds 100 nm, a larger amount of the carbon black should be added to the cleaning layer and thus the cleaning layer becomes brittle.

The DBP oil absorption of the carbon black is preferably from 70 to 600 cc/100 g, more preferably from 100 to 600 cc/100 g, particularly preferably from 100 to 500 cc/100 g.

The amount of the carbon black added is preferably from 1 to 20 wt. %, more preferably from 1 to 15 wt. %, particularly preferably from 2 to 10 wt. %, based on the weight of the magnetic powder.

Binder:

One example of the binder to be contained in the cleaning layer (the same in the case of the primer layer explained below) is a combination of a polyurethane resin and at least one resin selected from the group consisting of vinyl chloride resins, vinyl chloride-vinyl acetate copolymer resins, vinyl chloride-vinyl alcohol copolymer resins, vinyl chloride-vinyl acetate-vinyl alcohol copolymer resins, vinyl chloride-vinyl acetate-maleic anhydride copolymer resins, vinyl chloride-hydroxyl group containing alkyl acrylate copolymer resins and nitrocellulose. Among them, the combination of the polyurethane resin and the vinyl chloride-hydroxyl group containing alkyl acrylate copolymer resin is preferable.

Examples of the polyurethane resin include polyester polyurethane, polyether polyurethane, polyetherpolyester polyurethane, polycarbonate polyurethane, polyesterpolycarbonate polyurethane, etc.

Preferably, polyurethane resins having a functional group is preferably used. Examples of the functional group include —COOH, —SO$_3$M, —OSO$_2$M, —P=O(OM)$_3$, —O—P=O(OM)$_2$ wherein M is a hydrogen atom, an alkali metal salt group or a amine salt group, —OH, —NR$^1$R$^2$R$^3$R$^4$ wherein R$^1$, R$^2$, R$^3$ and R$^4$ are the same or different and represent a hydrogen atom or a hydrocarbon group, and an epoxy group. Such binder resins are preferably used since they improve the dispersibility of the magnetic powder, etc. When two or more binder resins are used, they preferably have the same functional group, in particular, the —SO$_3$M group.

The binders are used in an amount of 7 to 50 parts by weight, preferably 10 to 35 parts by weight per 100 parts by weight of the magnetic powder. In particular, a mixture of 5 to 30 parts by weight of the vinyl chloride resin and 2 to 20 parts by weight of the polyurethane resin is preferably used.

It is preferable to use a thermal curing type crosslinking agent, which crosslinks the binder through bonding with the functional groups in the binders, together with the binders. Preferable examples of the crosslinking gent include isocyanates (e.g. tolylenediisocyanate, hexamethylenediisocyanate, isophoronediisocyante, etc.), reaction products of these isocyanates with compounds having at least two hydroxyl groups (e.g. trimethlolpropane, etc.), and polyisocyanates such as condensation products of these isocyanates. The amount of the crosslinking agent to be used is usually from 10 to 50 parts by weight, preferably from 15 to 35 parts by weight, per 100 parts by weight of the binder.

Primer Layer:

The cleaning tape of the present invention may optionally have a primer layer between the nonmagnetic support and the cleaning layer. The cleaning tape having the primer layer may be produced by forming the cleaning layer on the primer layer in place of the magnetic layer in the production line for magnetic tapes having a primer layer. In such a cleaning tape, the primer layer having a smaller Young's modulus than that of the cleaning layer can prevent the excessive abrasion of the MR head because of the cushioning effects of the primer layer. In addition, the primer can decrease the specific surface resistivity of the cleaning tape.

When the cleaning tape is produced by only changing the magnetic layer of the magnetic tape having the primer layer for the cleaning layer, the primer layer preferably contains a specific amount of alumina having a specific particle size. In the case of the magnetic tape, the inclusion of such alumina in the primer layer can achieve the good recording characteristics at short wavelength and prevent the fluctuation of the output due to corrugation of the tape edge caused by slitting of a sheet to the tape having the designed width, even when the nonmagnetic support has low smoothness. These properties may not be necessary for the cleaning tape. However, the addition of specific alumina to the primer layer is advantageous, when the same intermediate products comprising the support and the primer layer are used in common in the production of the magnetic tapes and the cleaning tapes.

In such a case, the alumina to be added to the primer layer preferably has a particle size of 0.1 μm or less. When the particle size of the alumina exceeds 0.1 μm. the smoothness of the surface of the primer layer may deteriorate. The particle size of the alumina in the primer layer is preferably from 0.01 to 0.1 μm. more preferably from 0.03 to 0.09 μm, particularly preferably from 0.05 to 0.09 μm.

The amount of the alumina is preferably from 2 to 30 wt. % based on the weight of the whole inorganic powders including carbon black which are contained in the primer layer. When the amount of the alumina is less than 2 wt. %, the flowability of the coating for the primer layer is insufficient. When this amount exceeds 30 wt. %, the primer layer becomes too stiff so that the tape excessively warps. The amount of the alumina in the primer layer is preferably from 6 to 25 wt. %, more preferably from 8 to 20 wt. %, particularly preferably from 10 to 20 wt. %.

It is possible to use alumina having a particle size of 0.1 to 0.8 μm in an amount of less than 3 wt. % together with the alumina having the above smaller particle size.

When the primer layer contains the above specific alumina in the amount described above, the unevenness at the interface between the primer layer and the cleaning layer decreases so that the corrugation of the tape edge (edge weave) is suppressed. Such effects are remarkable, particularly when alumina comprising the corundum phase is used. In addition to the alumina, carbon black and nonmagnetic iron oxide are added to the primer layer for adjusting the conductivity and the strength of the layer, respectively.

Examples of the carbon black to be added to the primer layer include acetylene black, furnace black, thermal black, etc. The carbon black usually has a particle size of 5 to 200 nm, preferably 10 to 100 nm. Since the carbon black has a structure, when the particle size is less than 10 nm, it is difficult to disperse the carbon black in the coating. When the particle size exceeds 100 nm, the smoothness of the primer layer deteriorates.

The DBP oil absorption of the carbon black is preferably from 30 to 300 cc/100 g, more preferably from 30 to 200 cc/100 g, particularly preferably from 50 to 150 cc/100 g.

The amount of the carbon black to be added to the primer layer depends on its particle size and is preferably from 25 to 50 wt. % of the total weight of all the inorganic powders contained in the primer layer. When the amount of the carbon black is less than 25 wt. %, the conductivity may not be sufficiently increased. When the amount of the carbon black exceeds 50 wt. %, the effects of the carbon black may saturate. Preferably, the carbon black having a particle size of 15 to 80 nm is used in an amount of 15 to 35 wt. %, more preferably the carbon black having a particle size of 20 to 50 nm is used in an amount of 20 to 30 wt. %, since the electrical resistance decreases and an electrostatic noise or the irregular traveling of the tape are suppressed.

The nonmagnetic iron oxide to be added to the primer layer preferably has a particle size of 0.05 to 0.40 μm. When the particle size is less than 0.05 μm, the iron oxide may not be uniformly dispersed. When the particle size exceeds 0.40 μm, the unevenness at the interface between the primer layer and the cleaning layer may increase.

The amount of the nonmagnetic iron oxide is preferably from 35 to 83 wt. %. When the amount of the nonmagnetic iron oxide is less than 35 wt. %, the strength of the layer may not be sufficiently increased. When the amount of the nonmagnetic iron oxide exceeds 83 wt. %, the strength of the layer tends to decrease.

When the coating layer including the primer layer and the cleaning layer is formed, the Young's modulus of the coating layer is preferably in an appropriate range. When the Young's modulus of the coating layer is in the range between 40 to 100%, preferably between 50 and 100%, more preferably between 60 and 90%, of the average value of the Young's moduli in the machine direction and the transverse direction of the nonmagnetic support, the tape has the improved durability, and the touch between the tape and the head, that is, the contact of the tape with the head is improved. When the Young's modulus of the coating layer is less than 40% of the above average value, the durability of the coating layer decreases. When the Young's modulus of the coating layer exceeds 100% of the above average value, the head contact deteriorates. In one preferable embodiment of the present invention, the Young's modulus of the coating layer is adjusted by controlling the calendering conditions.

Furthermore, the Young's modulus of the primer layer is preferably from 80 to 99% of the Young's modulus of the cleaning layer. When the former is smaller than the latter, the primer layer may function as a cushion.

The primer layer and the cleaning layer of the coating layer may contain lubricants having different functions.

When the primer layer contains 0.5 to 4.0 wt. % of a higher fatty acid and 0.2 to 3.0 wt. % of an ester of a higher fatty acid, each based on the weight of the whole powders, a friction coefficient between the tape and the rotary cylinder preferably decrease in the case of a rotary head.

Examples of the higher fatty acid include lauric acid, myristic acid, palmitic acid, stearic acid, behenic acid, oleic acid, linoleic acid, etc.

Examples of the ester of the higher fatty acid include butyl stearate, octyl stearate, amyl stearate, isooctyl stearate, octyl myristate, butoxyethyl stearate, anhydrosorbitan monostearate, anhydrosorbitan distearate, anhydrosorbitan tristearate, etc.

When the amount of the higher fatty acid is less than 0.5 wt. %, the friction coefficient may not be sufficiently decreased. When the amount of the higher fatty acid exceeds 4.0 wt. %, the primer layer may be plasticized so that the layer loses the toughness. When the amount of the ester of the higher fatty acid is less than 0.5 wt. is the friction coefficient may not be sufficiently decreased. When the amount of the ester of the higher fatty acid exceeds 3.0 wt. %, the amount of the ester which migrates to the cleaning layer increases so that the tape and the rotary cylinder stick each other.

When the cleaning layer contains 0.5 to 3.0 wt. % of the fatty acid amide and 0.2 to 3.0 wt. % of an ester of a higher fatty acid, each based on the weight of the ferromagnetic powder, the friction coefficient between the tape and the rotary cylinder preferably decrease in the case of the rotary head.

Examples of the higher fatty acid amide includes amides of palmitic acid, stearic acid, etc.

When the amount of the fatty acid amide is less than 0.2 wt. %, the head and the cleaning tape are in direct contact to each other at the interface between them and thus the effect to prevent seizing may not be sufficient. When the amount of the fatty acid amide exceeds 3.0 wt. %, it may bleed out so that the traveling of the tape becomes unstable. When the amount of the ester of the higher fatty acid is less than 0.2 wt. %, the friction coefficient may not be sufficiently decreased. When the amount of the ester of the higher fatty acid exceeds 3.0 wt. %, the tape and the rotary cylinder stick each other.

In the case of the cleaning tape having no primer layer, the cleaning layer can contain the higher fatty acid in addition to the higher fatty acid amide and the ester of the higher fatty acid.

The lubricants in the cleaning layer and those in the primer layer may mutually migrate from one layer to the other.

Back Coat Layer

The cleaning tape of the present invention may optionally has a back coat layer on the surface of the nonmagnetic support opposite to the cleaning layer to improve the traveling properties.

The back coat layer may be a conventionally used back coat layer having a thickness of 0.2 to 0.8 μm. When the thickness of the back coat layer is less than 0.2 μm, the traveling properties may not be sufficiently improved. When the thickness of the back coat layer exceeds 0.8 μm, the total thickness of the tape increases and thus the length of the tape in one reel is shortened.

The back coat layer may contain carbon black. In such a case, the carbon black may be acetylene black, furnace black, thermal black, etc. In general, a mixture of small particle size carbon black and large particle size carbon black is used.

The small particle size carbon black usually has a particle size of 5 to 200 nm, preferably 10 to 100 nm. When the particle size of the small size carbon black is less than 5 nm, it is difficult to disperse the carbon black in the coating. When the particle size exceeds 100 nm, a large amount of the small particle size carbon black should be added. In either case, the surface of the back coat layer becomes rough, and a large amount of powder drops off from the back coat layer so that such powder is transferred to the cleaning layer or contaminates the traveling path of the tape.

Preferably, the large particle size carbon black having a particle size of 300 to 400 nm is used in an amount of 5 to 15 wt. % of the small particle size carbon black, since the surface of the back coat layer is not roughened and thus the traveling properties of the tape are greatly improved.

The total amount of the two types of carbon black is preferably from 60 to 98 wt. %, more preferably from 70 to 95 wt. %, of the whole amount of the inorganic powders (e.g. α—$Fe_2O_3$, $BaSO_4$, etc.). The surface roughness Ra of the back coat layer is preferably from 3 to 10 nm, more preferably from 4 to 9 nm.

The back coat layer preferably contains iron oxide having a particle size of 0.1 to 0.6 μm, more preferably from 0.2 to 0.5 μm, to increase the strength of the layer. The amount of the iron oxide in the back coat layer is preferably from 2 to 40 wt. %, more preferably from 5 to 30 wt. %, based on the total weight of the inorganic powders in the back coat layer.

Organic Solvent:

An organic solvent contained in the coating for forming the cleaning layer, the primer layer or the back coat layer may be any organic solvent that is used in the coating for forming the magnetic layer of the conventional magnetic tape. Specific examples of the organic solvent include ketones (e.g. methyl ethyl ketone, cyclohexanone, methyl isobutyl ketone, etc.), ethers (e.g. tetrahydrofuran, dioxane, etc.), and acetates (e.g. ethyl acetate, butyl acetate, etc.). They may be used singly or as a mixture of two or more of them. Furthermore, they may be used in combination with an aromatic solvent such as toluene, etc.

EXAMPLES

The present invention will be illustrated by the following examples, which do not limit the scope of the present invention in any way. In the Examples, "parts" are "parts by weight" unless otherwise indicated.

Example 1

Preparation of Coating for Primer Layer

The following components were provided for the preparation of a coating for a primer layer:

| (1) | |
|---|---|
| Iron oxide powder (particle size 0.11 × 0.02 μm) | 60 parts |
| Alumina (degree of alphatization: 50%; particle size: 0.07 μm) | 10 parts |
| Carbon black (particle size: 25 nm; DBP oil absorption: 50 cc/100 g) | 30 parts |
| Stearic acid | 2.0 parts |
| Vinyl chloride-hydroxyproyl acrylate copolymer (—$SO_3Na$ content: 0.7 × $10^{-4}$ eq./g) | 10 parts |
| Polyester polyurethane resin (Tg: 40° C.: —$SO_3Na$ content: 1 × $10^{-4}$ eq./g) | 4.5 parts |
| Cyclohexanone | 25 parts |
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate (Coronate L available from Nippon Polyurethane Co., Ltd.) | 4.5 parts |
| Cyclohexanone | 10 parts |
| Methyl ethyl ketone | 15 parts |
| Toluene | 10 parts |

The components of the group (1) were kneaded with a kneader. Then, with this mixture, the components of the group (2) were stirred and dispersed with a sand mill for a given time. To the dispersion, the components of the group (3) were added and stirred, and the mixture was filtrated to obtain a coating for a primer layer.

Separately, the following components were provided for the preparation of a coating for a cleaning layer:

| (i) | |
|---|---|
| Ferromagnetic iron metal powder (Al/Fe: 5 wt. %, Co/Fe: 20 wt. %, Y/Fe: 2 wt. %; $\sigma_s$: 135 A · $m^2$/kg (135 emu/g); Hc: 2300 Oe; major axis length: 0.10 μm) | 100 parts |
| Vinyl chloride-hydroxypropyl acrylate copolymer (—$SO_3Na$ content: 0.7 × $10^{-4}$ eq./g) | 11 parts |
| Polyester polyurethane resin (—$SO_3Na$ content: 1.0 × $10^{-4}$ eq./g) | 5 parts |
| Alumina (particle size: 0.3 μm) | 10 parts |
| Chrome Green (particle size: 0.5 μm) | 10 parts |
| Carbon black (particle size: 40 nm; DBP oil absorption: 180 cc/100 g) | 1.0 part |
| Methyl acid phosphate | 2 parts |
| Palmitic acid amide | 1.5 parts |
| n-Butyl stearate | 1.5 parts |
| Tetrahydrofuan | 65 parts |
| Methyl ethyl ketone | 245 parts |
| Toluene | 85 parts |
| (ii) | |
| Polyisocyanate (Coronate L available from Nippon Polyurethane Co., Ltd.) | 4 parts |
| Cyclohexanone | 167 parts |

The components of the group (i) were kneaded with a kneader and dispersed in a sand mill for a given time. To the dispersion, the components of the group (ii) were added and stirred, and the mixture was filtrated to obtain a coating for a cleaning layer.

The coating for the primer layer was applied on a support consisting of a polyethylene naphthalate film (thickness: 6.0 μm; Young's modulus in MD=7.5 GPa; Young's modulus in TD (transverse direction—Young's modulus in MD×0.8 (namely–20%); trade name: TEIJIN TEONEX available from Teijin) so that the dry thickness became 1.8 μm. On the primer layer, the coating for the cleaning layer was applied so that the dry thickness became 0.2 μm to obtain a cleaning sheet. The coating speed was 150 m/min. The product of the residual flux density and the thickness (Br·σ) was 0.060 μTm.

The following components were provided for the preparation of a coating for a back coat layer:

| Carbon black (particle size: 25 nm) | 80 parts |
|---|---|
| Carbon black (particle size: 370 nm) | 10 parts |
| Iron oxide (particle size: 0.4 nm) | 10 parts |
| Nitrocellulose | 45 parts |
| Polyurethane resin (having $SO_3Na$ groups) | 30 parts |
| Cyclohexanone | 260 parts |
| Toluene | 260 parts |
| Methyl ethyl ketone | 525 parts |

The above components were dispersed with a sand mill for a given time, and then 15 parts of a polyisocyanate was added to obtain a coating for a back coat layer. After filtration, the coating was applied on the surface of the support opposite to the surface on which the primer layer and the cleaning layer had been formed, so that the dry thickness became 0.5 μm, and dried.

The cleaning sheet obtained in the above step was wound around a core and aged at 60° C. for 48 hours. Then, the sheet was calendered with a metal roll at 70° C. under a linear pressure of 120 kg/cm and cut to a DAT width or ½ inch. The surface of the cleaning layer was abraded with a lapping tape (K20000) at a running speed of 200 m/min. and then wiped with a wiping cloth (TORAYSEE) to obtain a cleaning tape.

The cleaning tape was assembled in a cartridge to obtain a cartridge type cleaning tape.

Examples 2–7

A cleaning tape of each of Examples 2–7 was produced in the same manner as in Example 1 except that the amount of carbon black and the thickness of the cleaning layer, the kind of the nonmagnetic support and the presence of the primer layer were changed as shown in Table 1.

Comparative Example 1

A cleaning tape of this Comparative Example was produced in the same manner as in Example 1 except that some conditions were changes as shown in Table 1.

The cleaning tapes were evaluated as follows:

Specific Surface Resistivity of Cleaning Layer:

The specific surface resistivity of each cleaning tape was measured according to JIS C 6240-1970 (7), 9.4.1.

Center line average surface roughness of cleaning layer (Ra; Unit: nm):

The surface roughness of the cleaning layer was measured with a surface roughness meter (SE-3FA manufactured by KOSAKA KENKYUSHO). The cleaning tape was adhered to a smooth glass semicylinder with facing the suface having the back coat layer to the glass semicylinder. Then, the surface roughness of the cleaning layer was measured with a stylus having a tip radius of 5 μm at a magnification of 100,000 times in the vertical direction with a cut-off of 0.08 mm.

Young's Modulus of Cleaning Tape:

A sample of the tape with a width of 12.65 mm and a length of 150 cm was provided, and a load-elongation curve was measured with an Instron type universal tester to measure the Young's modulus in the machine direction (unit: GPa) and that in the transverse direction (unit: GPa). The sample was pulled with a chuck distance of 100 mm at a pulling rate of 20 mm/min. Then, the Young's modulus was calculated from the load at 0.3% elongation recorded in the chart.

DDS3 Drive/Head Cleaning Effect:

With a DDS3 drive (manufactured by Hewlett-Packard), the output (100%) of a DDS3 tape (HS-4/125S manufactured by Hitachi Maxell Limited) and those of the cleaning tapes of Examples 1–6 and Comparative Example 1 were measured using a magnetic head in the initial condition. Then, a test tape for generating head clogging and contamination was traveled on the same drive for a given time. After confirming that the output of the DDS3 tape was 40% or less, each cleaning tape was traveled until the output in the initial condition was restored, and the time necessary to restore the initial output was recorded. When this time was 20 seconds or less, the cleaning tape was ranked "Good", when it was from 21 to 45 second the tape was ranked "Fair", and when it was 46 seconds or longer, the tape was ranked "No Good (N.G.)".

After cleaning, DDS3, DDS2 and DDS tapes were traveled and the compatibility was evaluated.

LTO (Ultrium) Drive/Head Cleaning Effect:

With a LTO drive, the output (100%) of a LTO tape (manufactured by Hitachi Maxell Limited) and those of the cleaning tapes Examples 1–6 and Comparative Example 1 were measured using a magnetic head in the initial condition. Then, a test tape for generating head clogging and contamination was traveled on the same drive for a given time. After confirming that the output of the LTO tape was 40% or less, each cleaning tape was traveled until the output in the initial condition was restored, and the time necessary to restore the initial output was recorded. When this time was 20 seconds or less, the cleaning tape was ranked "Good", when it was from 21 to 45 second the tape was ranked "Fair"; and when it was 46 seconds or longer, the tape was ranked "No Good".

In addition, the influence on the MR head during cleaning was evaluated according to the following criteria:

Good: No abnormality

No Good: Breakdown of the MR device due to static electricity or abnormality similar to such breakdown.

Observation of Head Surface

With each head, the head surface was observed with an optical microscope before and after cleaning and ranked according to the following criteria:

Good: No abnormality

Fair: Substantially no abnormality

No Good: Cleaning failure such as flaws or uneven abrasion

The results are shown in Table 1.

TABLE 1

|  | Ex. 1 | Ex. 2 | Ex. 3 | Ex. 4 | Ex. 5 | Ex. 6 | C. Ex. 1 |
|---|---|---|---|---|---|---|---|
| Support Resin | PEN | Aramid | PET | PEN | Aramid | PET | PET |
| Thickness (μm) | 6.0 | 3.9 | 6.2 | 6.0 | 3.9 | 6.2 | 10.9 |
| Cleaning layer | | | | | | | |
| Thickness (μm) | 0.2 | 0.2 | 0.2 | 0.2 | 0.2 | 0.2 | 0.2 |
| Carbon black (wt. parts) | 1.0 | 1.5 | 2.0 | 2.5 | 3.0 | 3.5 | 0.5 |
| Primer layer | | | | | | | |
| Thickness (μm) | 1.7 | 1.7 | 1.7 | 1.7 | 1.7 | 3.7 | 1.7 |
| Carbon black (wt. parts) | 30 | 30 | 30 | 30 | 30 | 30 | 18 |
| Calendering | Yes | Yes | Yes | Yes | Yes | Yes | No |
| Cleaning tape | | | | | | | |
| Specific surface resistivity ($\Omega/cm^2$) | $3 \times 10^7$ | $1.5 \times 10^7$ | $7 \times 10^6$ | $1.5 \times 10^6$ | $5 \times 10^5$ | $3 \times 10^5$ | $2 \times 10^9$ |
| Surface roughness (Ra) | 15 | 13 | 16 | 17 | 14 | 21 | 48 |
| Tape thickness (μm) | 8.4 | 6.3 | 8.6 | 8.4 | 6.3 | 8.6 | 13.3 |
| Young's modulus in MD (GPa) | 10.6 | 12.5 | 8.0 | 10.2 | 12.8 | 8.3 | 7.3 |
| $ET^3$ (Pa · m$^3$) | $6 \times 10^{-6}$ | $3 \times 10^{-6}$ | $5 \times 10^{-6}$ | $6 \times 10^{-6}$ | $3 \times 10^{-6}$ | $5 \times 10^{-6}$ | $2 \times 10^{-5}$ |
| DDS3 drive | | | | | | | |
| Cleaning effect | Good | Good | G–F | Good | Good | G–F | F–N.G.[2)] |
| Head observation | Good | Good | G–F | Good | Good | G–F | N.G. |

TABLE 1-continued

|  | Ex. 1 | Ex. 2 | Ex. 3 | Ex. 4 | Ex. 5 | Ex. 6 | C. Ex. 1 |
| --- | --- | --- | --- | --- | --- | --- | --- |
| Output after cleaning | 99% | 108% | 92% | 99% | 108% | 83% | 72% |
| Compatibility | G–F[1)] | Good | Fair | G–F | Good | N.G. | N.G. |
| LTO drive |  |  |  |  |  |  |  |
| Cleaning effect | Good | G–F | Fair | Good | G–F | Fair | F–N.G. |
| Head observation | Good | Good | G–F | Good | Good | G–F | N.G. |
| Influence on MR device | Good | Good | Good | Good | Good | Good | F–N.G. |
| Output after cleaning | 112% | 99% | 92% | 105% | 92% | 90% | 78% |

Note: [1)]Good to Fair. [2)]Fair to No Good.

As can be seen from the results of Table 1, the cleaning tapes of Examples 1 to 7 according to the present invention had no adverse influence (in Examples 1–6) on the MR device of the LTO drive due to the static electricity, while the cleaning tape of Comparative Example 1 caused the abnormality of the MR device due to the electrostatic breakdown.

When the cleaning tapes of Examples 1, 2, 4 and 5 were used to clean the head of the LTC drive, the surface of the head was not flawed or unevenly abraded and good head contact could be attained. In comparison with the cleaning effects achieved by these cleaning tapes of Examples 1, 2, 4 and 5, the cleaning effects by the cleaning tapes of Examples 3 and 6 were slightly decreased, but the generation of the flaws and the uneven abrasion were much less than the cleaning tape of Comparative Example 1, and the cleaning tapes of Examples 3, 6 and 7 did not deteriorate the head contact.

When the cleaning tape of Comparative Example 1 was used to clean the head of the LTO drive, the output of the LTO tape after cleaning restored only 78% of the initial output, while when the cleaning tapes of Examples 1 to 6 were used, the output of the LTO tape after cleaning could restore at least 90% of the initial output (in the case of Example 6), and even 112% of the initial output (in the case of Example 1).

What is claimed is:

1. A cartridge type cleaning tape for a magnetic head system having a magnetoresistance effect head as a reproducing head, said cleaning tape comprising a nonmagnetic support, a cleaning layer containing a magnetic powder and a binder formed on one surface of said support, and a backcoating layer formed on the other surface of said support, wherein said cleaning tape has a total thickness of 3 to 9 $\mu$m, a product of a residual magnetic flux density and a thickness (Bru) of said cleaning layer is from 0.005 to 0.08 $\mu$Tm, said cleaning layer has a specific surface resistivity of $3 \times 10^3$ to $5 \times 10^8$ $\Omega 2/cm^2$ according to JIS C 6240-1970U, and said backcoating layer has a surface roughness Ra of 3 to 10 nm.

2. The cartridge type cleaning tape according to claim 1, wherein said cleaning tape comprises at least one layer.

3. A cleaning cassette comprising a box-shaped case body and a cleaning tape of claim 1 wound on a single reel installed in said case body.

\* \* \* \* \*

UNITED STATES PATENT AND TRADEMARK OFFICE
CERTIFICATE OF CORRECTION

| | | |
|---|---|---|
| PATENT NO. | : 6,798,617 B2 | Page 1 of 1 |
| APPLICATION NO. | : 09/950599 | |
| DATED | : September 28, 2004 | |
| INVENTOR(S) | : Misawa | |

It is certified that error appears in the above-identified patent and that said Letters Patent is hereby corrected as shown below:

Claim 1, at column 16, line 18, should be corrected as follows:

1. A cartridge type cleaning tape for a magnetic head system having a magnetoresistance effect head as a reproducing head, said cleaning tape comprising a nonmagnetic support, a cleaning layer containing a magnetic powder and a binder formed on one surface of said support, and a backcoating layer formed on the other surface of said support, wherein
said cleaning tape has a total thickness of 3 to 9 μm, a product of a residual magnetic flux density and a thickness "Bru" --(Br · σ)-- of said cleaning layer is from 0.005 to 0.08 μTm, said cleaning layer has a specific surface resistivity of 3 x $10^3$ to 5 x $10^8$ "Ω2/$cm^2$" --Ω/$cm^2$-- according to JIS C 6240-1970U, and said backcoating layer has a surface roughness Ra of 3 to 10 nm.

Signed and Sealed this

Twenty-ninth Day of August, 2006

JON W. DUDAS
*Director of the United States Patent and Trademark Office*